Oct. 19, 1948.  N. A. NELSON  2,451,862
FISHING REEL SUPPORT OR FRAME
Filed Aug. 26, 1943
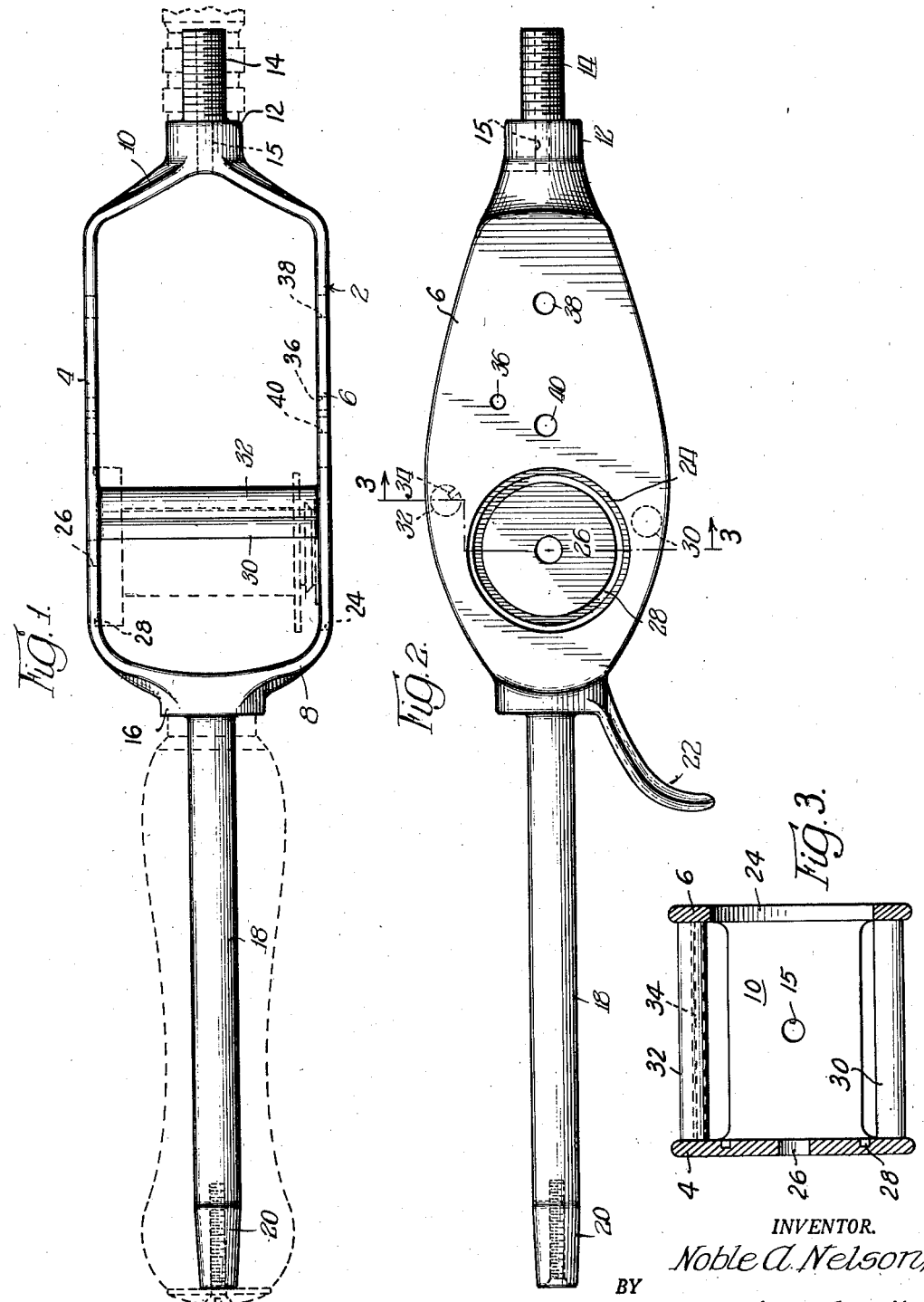
INVENTOR.
Noble A. Nelson,
BY
Wilkinson, Huxley, Byron + Knight Patented Oct. 19, 1948

2,451,862

UNITED STATES PATENT OFFICE 2,451,862

FISHING REEL SUPPORT OR FRAME

Noble A. Nelson, Chicago, Ill., assignor of one-fifth to Harold Freevol, one-fifth to Sam Smedberg, one-fifth to Howard Brandon, and one-fifth to Carl E. Anderson Application August 26, 1943, Serial No. 500,038

2 Claims. (Cl. 43—20)

The present invention relates to fishing reels and, more in particular, to novel constructions for reel frames.

Among the objects of the present invention is to provide a novel reel frame which is of simplified construction in which a number of parts of the conventional type reel frame have been eliminated, yet one which can be fabricated at greatly reduced cost and in which the parts of the reel can be easily and readily assembled in association therewith and in which greater rigidity and strength is secured in the final reel structure.

The present invention is grounded on the idea of forming a reel frame as an integral member, preferably as a die casting, which not only embodies a housing structure for the component parts of the reel assembly but likewise involves, as additional elements, means for securing a rod at one end thereof and means forming the core of a handle for the rod and reel at the other end thereof.

More particularly, the present invention has to do with the provision of a novel reel frame structure so formed as to embody means for assembling the conventional type of reel mechanism but likewise, in addition thereto, other and further mechanisms for preventing back-lash of the fishing line, all in accordance with the disclosure in an application Serial No. 499,602, filed on August 23, 1943, for Fishing reels, now Patent No. 2,380,670, granted July 31, 1945.

Other objects, features, capabilities and advantages are comprehended by the present invention, as will later appear and as are inherently possessed thereby.

Referring to the drawings—

Fig. 1 is a top plan view of a reel frame made in accordance with the present invention and showing conventional elements such as the ferrule, handle and spool in dotted lines;

Fig. 2 is a view in side elevation of the reel frame shown in Fig. 1 of the drawings; and Fig. 3 is a view in cross section taken in the plane represented by line 3—3 of Figure 2 of the drawings.

Referring now more in detail to the drawings, a reel frame embodying novel features of construction in accordance with the present invention is disclosed in the drawings as comprising an integrally formed member 2 having a central housing adapted to receive certain reel mechanism in association therewith in forming the completed reel assembly, and which housing is provided with the oppositely disposed side walls 4 and 6 and the oppositely disposed end walls 8 and 10. The end wall 10 is of V-shaped construction in which the parts converge from the side walls 4 and 6 to terminate in the enlarged, thickened circular boss 12 from which projects a stud element 14 screw-threaded exteriorly to receive a ferrule fitting whereby a rod may be secured to the reel frame. The circular boss 12 and stud element 14 have a bore or passage extending centrally through the same identified by numeral 15.

The end wall 8 is of a construction somewhat similar to the end wall 10 and is formed with a thickened, centrally located part 16 from which projects the elongated element 18 adapted to form the core of a handle for manipulating the rod and reel. This core 18 is encompassed or embraced by cork rings in a conventional manner, the inner end ring of the series abutting the enlarged shoulder formed by the boss 16 and the outer ring of the series being held in place by a conventional cap which may be secured in place by a screw-threaded member engaging the internally threaded bore 20 at the end of the elongated element 18, as shown diagrammatically in dotted lines in Figure 1.

If desired, the reel frame may include the finger hook 22 projecting laterally of the core 18 at, or adjacent, its junction with the end wall 8, which finger hook facilitates a grasping of the reel for a casting operation.

The reel frame as disclosed in the drawings is of such a construction that the same can be readily and easily manufactured on a mass production basis, preferably by means of die casting, using metals or metal alloys of rather low specific gravity to assure light weight and proper balance in the formation of the completed product. Furthermore, the reel frame as disclosed takes the form of a reel frame as generally disclosed in the hereinabove mentioned application, involving in addition to conventional mechanisms other and further devices to prevent back-lash in the line disposed upon the spool, and which greatly facilitates casting procedures. Accordingly, the present reel frame contemplates the formation of an integral body member which can be placed in suitable jigs for proper machining of those points required for a completed job, such, for example, as the opening 38 which is provided for securing a bracket to the reel frame for supporting an idler roll of line conveyor mechanism which may be associated therewith.

In addition, the side wall 6 is provided with the opening 24 to receive the spool which has its spindle concentrically located within the opening 26 formed in the side frame member 4. Also, as a means of aligning the spool with respect to the reel frame, the inside face of the side plate or frame member 4 may be formed with an annular groove 28 concentrically arranged with respect to the opening 26 as well as the opening 24.

As an additional feature of construction, the side walls 4 and 6 may be reinforced by the integrally connected pillars or reinforcing elements 30 and 32, the reinforcing element 32 being formed with a transverse slot 34 adapted to receive and guide an element of a level winding mechanism which is embodied in the contemplated reel assembly.

In the finishing of the reel frame, additional openings such as 36 and 40 may be formed in the side wall members 4 and 6, the said openings 36 and 38 being provided especially for certain of the mechanism constituting a line conveyor in the finished assembly, and the openings 40 being provided for the level winding mechanism which is also to be incorporated in a reel structure as herein contemplated.

While the drawings disclose a reel support or frame of the general type particularly disclosed in the hereinabove mentioned application, nevertheless, it is to be understood that the invention in its broadest aspect contemplates other reel frames of integral construction having the advantages as hereinbefore enumerated and which may not include certain of the specific details of construction which have been described above. The frame of the present application differs somewhat in details of design and location of parts from that disclosed in the prior application and is not designed to receive that reel structure as specifically disclosed in details and relative dimensions. By forming the reel frame as a die casting increased production of reels can be secured at less cost than heretofore experienced and in which the structure as a whole has far greater rigidity and strength. Furthermore, the present type of frame construction lends itself admirably to decreased cost in the assembly of the various parts going into the reel structure. It has also been found that because of the elimination of a large number of parts, smaller tolerances can be secured, thus greatly decreasing wear and leading to further and greater perfection in the operation of the completed assembly over a greater period of time.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. As an article of manufacture, a reel frame comprising a one piece integral member including an elongated housing having opposed side and end walls adapted to receive operating mechanism for the reel and in which the width of said side walls is greater than the diameter of the spool of said operating mechanism, said end walls being provided with laterally projecting elements, one being with securing means to receive a rod ferrule, and the other being provided as a core for a handle for said rod and reel and having securing means for a finishing cap for said handle, the upper and lower faces of the frame being open, and one or more reinforcing elements extending between said opposed side walls.

2. As an article of manufacture, a reel frame comprising a one-piece integral member including an elongated housing having opposed side and end walls adapted to receive operating mechanism for the reel and in which the width of said side walls is greater than the diameter of the spool of said operating mechanism, said end walls being provided with laterally projecting elements, one being with securing means to receive a rod ferrule, and the other being provided as a core for a handle for said rod and reel and having securing means for a finishing cap for said handle, the upper and lower faces of the frame being open, an element projecting laterally of said core and adjacent its juncture with an end wall adapted to serve as a finger hook when the handle is gripped by a caster, and one or more reinforcing elements extending between said opposed side walls, one of said side walls having an opening for receiving said spool and the other of said side walls being formed with an annular groove concentrically arranged with respect to said opening serving as a guide for said spool.

NOBLE A. NELSON.

REFERENCES CITED

The following references are of record in the file of this patent:

UNITED STATES PATENTS

| Number | Name | Date |
|---|---|---|
| 389,070 | Gillet | Sept. 4, 1888 |
| 756,364 | Hermance | Apr. 5, 1904 |
| 787,055 | Schreidt | Apr. 11, 1905 |
| 1,328,696 | Smith | Jan. 20, 1920 |
| 1,558,310 | Swazey | Oct. 20, 1925 |
| 1,572,104 | Budd | Feb. 9, 1926 |
| 1,591,122 | Gephart | July 6, 1926 |
| 1,605,710 | Ford | Nov. 2, 1926 |
| 1,735,026 | Welch | Nov. 12, 1929 |
| 1,895,304 | Ancona | Jan. 24, 1933 |
| 2,172,389 | Kerr | Sept. 12, 1939 |

FOREIGN PATENTS

| Number | Country | Date |
|---|---|---|
| 2,900 | Great Britain | 1888 |
| 44,567 | France | Dec. 5, 1934 |